(12) United States Patent  (10) Patent No.: US 9,275,656 B1
Contreras et al.  (45) Date of Patent: Mar. 1, 2016

(54) DISK DRIVE WITH CHANNEL AND PREAMP WITH DYNAMIC WRITE-CURRENT CONTROL FOR WRITE HEAD

(71) Applicant: HGST Netherlands B.V., Amsterdam (NL)

(72) Inventors: John Contreras, Palo Alto, CA (US); Samir Y. Garzon, San Jose, CA (US); Weldon Mark Hanson, Rochester, MN (US); Alexander Taratorin, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/804,063

(22) Filed: Jul. 20, 2015

(51) Int. Cl.
G11B 5/09 (2006.01)
G11B 20/10 (2006.01)

(52) U.S. Cl.
CPC ............ *G11B 5/09* (2013.01); *G11B 20/10388* (2013.01)

(58) Field of Classification Search
CPC ............... G11B 20/10009; G11B 5/09; G11B 2220/90; G11B 2220/20; G11B 5/012; G11B 5/02
USPC .................... 360/68, 39, 46, 71, 67
See application file for complete search history.

(56) References Cited

U.S. PATENT DOCUMENTS

| 6,798,591 | B2 | 9/2004 | Barnett et al. |
| 6,826,003 | B1 | 11/2004 | Subrahmanyam |
| 6,870,697 | B2 | 3/2005 | Ikekame et al. |
| 7,450,326 | B2 | 11/2008 | Hidaka |
| 7,660,064 | B2 | 2/2010 | Howley et al. |
| 7,830,631 | B2 | 11/2010 | Nakagawa et al. |
| 7,839,589 | B2 | 11/2010 | Barnett et al. |
| 8,413,020 | B2 * | 4/2013 | Liu ........................ G06F 3/05 714/775 |
| 8,565,047 | B2 | 10/2013 | Wilson |
| 2013/0057319 | A1 | 3/2013 | Liu et al. |
| 2013/0083419 | A1 | 4/2013 | Springberg et al. |
| 2013/0128375 | A1 | 5/2013 | Livshitz et al. |

FOREIGN PATENT DOCUMENTS

WO    WO0129829 A1    4/2001

* cited by examiner

*Primary Examiner* — Nabil Hindi
(74) *Attorney, Agent, or Firm* — G. Marlin Knight (57) ABSTRACT

Disk drives with a Channel System and Write Driver Preamp architecture that dynamically adjusts the write driver's signal wave-shape depending on the write data signal pattern are described. The wave-shape control signal is generated in the Channel and transmitted to the Write Driver Preamp. Embodiments of the invention provide discrete n-level overshoot amplitude control using amplitude-level modulated (AML) signal. One embodiment implements a look-ahead strategy overshoot amplitude control where the overshoot amplitude for each transition depends only on the subsequent (following) bits in the data stream and not on any previously recorded data.

18 Claims, 6 Drawing Sheets

Latch Clock 45 is set by transitions in data Tn

DISK DRIVE WITH CHANNEL AND PREAMP WITH DYNAMIC WRITE-CURRENT CONTROL FOR WRITE HEAD

FIELD OF THE INVENTION

Embodiments of the invention relate generally to methods and devices used in magnetic data storage systems with rotating disks, and more particularly to generation of signals for driving inductive write heads, which are used in such systems.

BACKGROUND

Figure 1:
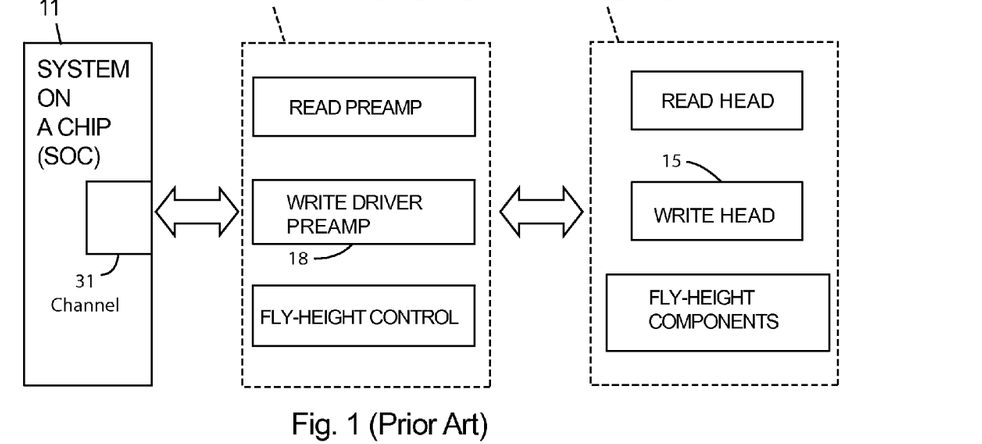
FIG. 1 is a block illustration of selected components of a prior art disk drive.

A prior art disk drive 10, see FIG. 1, typically includes a main integrated circuit, which is typically called a system on a chip (SOC) 11 that contains many of the electronics and firmware for the drive including the read/write channel system 31. Each disk (not shown) can have thin film magnetic material on each of the planar surfaces. Each disk surface normally has a dedicated pair of read and write heads packaged in a slider 13 that also includes fly-height control components. The sliders are mechanically mounted on an actuator (not shown) with various flexible components to allow appropriate degrees of movement during operation. Each slider is a sub-component of a head gimbal assembly (HGA) that typically includes a suspension assembly with a laminated flexure with copper traces to carry the electrical signals to and from the heads. The read and write heads (sensors) heads and associated connections are conventionally formed using thin film lithographic patterning in which a series of thin films deposited and patterned on the trailing surface slider.

The sliders are selectively positioned over tracks on the rotating disk by the actuator (not shown). The actuator also supports the electrical connections to the slider components and contain the arm electronics (AE) chip 12 which typically include preamplifiers (preamps) for the read heads, write drivers and fly-height controls. The number of signal lines that can be connected between the Channel 31 and AE 12 is relatively small because of the space limitations; therefore, improvements that do not require additional signal lines are preferred.

Unless otherwise noted, the term actuator will be used herein to include all of the mechanical and electrical components that are required for the sliders to function. A flex cable (not shown) connects the SOC 11 to the AE 12. The AE typically include digital and analog circuitry that control the signals sent to components in the slider and processes the signals received from the slider components. The write driver preamp 18 generates an analog current signal that is applied to the inductive coil in the write head 15 to write data by selectively magnetizing portions of the magnetic material on the surface of the rotating disk and creating magnetic transitions. An adjacent pair of magnetic transitions is generally called a dibit.

Current-mode logic (CML) is a digital input/output (I/O) interfacing logic scheme typically used between the channel and the write driver preamp. CML is a differential logic family that is used to transmit serial data to the write driver preamp to produce the pre-programmed wave shape at the write driver's output. The write driver's signal is then applied to the write transducer that writes the data to the disk media.

The control of the shape and amplitude of the current signal that is applied to the inductive coil in the write head 15 by the write driver preamp 18 is critical for optimizing the recording performance. Conventionally disk drives use write current overshoot amplitude (OSA) control to ensure that the write current reaches a peak value before the next magnetic transition. Write pre-compensation circuits are also used to compensate for non-linear bit shift caused by closely spaced transitions. An efficient magnetic field is particularly important when writing a relatively long magnetic section (called a long magnet) on a data track. A long magnet is an area of a track that is magnetized in one direction with a relatively long spacing between transitions.

U.S. Pat. No. 6,826,003 to Subrahmanyam (Nov. 30, 2004) describes a disk drive with a pattern dependent overshoot circuit for controlling write current overshoot. Predetermined patterns in the write data cause adjustments to the write current overshoot amplitude (OSA).

Figure 2:
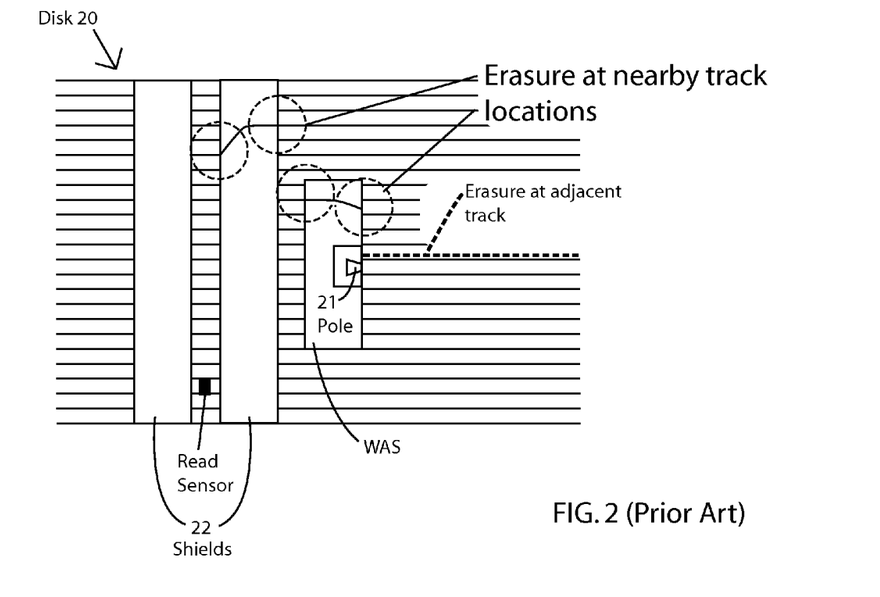
FIG. 2 illustrates the adjacent tracks erasure problem for repeatedly written tracks in the prior art.

Disk storage areal densities continue to increase, which results in narrower data track pitches. Portions of previously written adjacent tracks can degrade as repeated writes to the same track can create interference/erasure on the adjacent tracks. FIG. 2 illustrates the adjacent tracks erasure problem for repeatedly written tracks on disk 20. The adjacent tracks next to the track where write head pole 21 is positioned are subject to erasure from the field that extends beyond the width of the target track. In addition the shields in the slider can also cause stray magnetic fields which place nearby tracks at risk of being inadvertently erased. The read head sensor is positioned between two shields 22. These shields 22 can also result in erasure at track positions that are relatively far from the track where the write head pole 21 is positioned. Similarly the write-around shield (WAS) can cause erasure at track positions other than the immediately adjacent track.

Test measurements have shown that adjacent and nearby by track erasure varies with the write data's frequency and/or pattern. Embodiments of the present invention address the problem of track erasure dependence on written data frequency and/or pattern. A timing circuit has been described in the prior art to address the problem of track erasure in a similar application, but in that case the peak current for a particular magnetic transition could only be adjusted depending on the previous bits (i.e., a look-back algorithm). However, this look-back strategy cannot be used to, for example, adjust the overshoot current of the first transition within a dibit or the first transition preceding a long magnet, both of which have historically been problematic.

SUMMARY OF THE INVENTION

Embodiments of the invention include disk drives with a Channel System and Write Driver Preamp architecture that dynamically adjusts the write driver's signal wave-shape depending on the write data signal pattern. The wave-shape control signal is generated in the Channel and transmitted to the Write Driver Preamp. In embodiments of the invention, the wave-shape control signal can be transmitted to the Write Driver Preamp on a dedicated signal line, transmitted on the read signal lines or be encoded along with the write data and transmitted as a composite signal on the write lines. In embodiments the wave-shape control signal can be encoded as an amplitude-level modulated (AML) signal that can be separately transmitted or can be combined with the Current-mode logic (CML) write data signal to form an AML-CML signal that is transmitted on the write data lines. The Write Driver Preamp demodulates the AML-CML to determine the required wave-shape for the write driver output signal. The Channel analyzes the bit patterns in the data to be written to determine the overshoot amplitude modulation. This system will be referred to as the Channel-Preamp Dynamic Wave Shape (CP-DWS) system. Embodiments can implement a look-ahead, look-back, or combined look-back/look-ahead strategies.

Embodiments of the invention provide discrete n-level overshoot amplitude control using amplitude-level modulated (AML) signal. One embodiment implements a look-ahead strategy overshoot amplitude control where the overshoot amplitude for each transition depends only on the subsequent (following) bits in the data stream and not on any previously recorded data.

An embodiment of the Write Driver Preamp includes a delay path for the CML write data signal and an overshoot amplitude control unit that demodulates the AML signal, times the trigger and accesses the preset parameter values.

In one embodiment pre-setting of the positive current overshoots (OSA:+Iw) and negative overshoots (OSA:-Iw) is not done in the same phase as the write data. This embodiment allows pre-loading of the overshoot amplitude control for the subsequent write data transition. Alternating switching buffer with separate Trigger Signal Generators for positive (+Iw) and negative write currents (-Iw) are used, which allows a one time period (1T) setup time between transitions.

In an embodiment a preprogrammed delay between the write data and the overshoot control signal is controlled by the Channel, which can be programmed to adjust this delay to accommodate the phase in the Channel and the Write Driver Preamp.

DETAILED DESCRIPTION OF THE INVENTION

Figure 3:
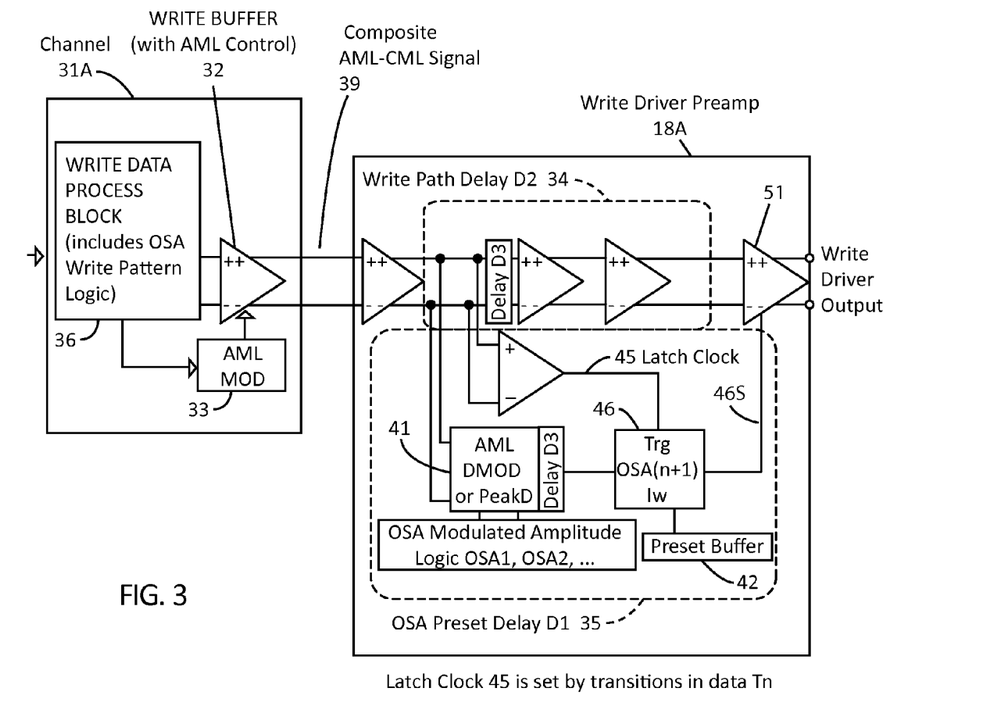
FIG. 3 is a block diagram illustrating selected components in a disk drive with a Channel-Preamp Dynamic Wave Shape system according to a first embodiment of the invention.

FIG. 3 is a block diagram illustrating selected components in a disk drive with a Channel-Preamp Dynamic Wave Shape (CP-DWS) system according to a first embodiment of the invention. Components in the embodiment reside in the channel 31A and in the write driver Preamp 18A. The write data stream, which is input into the channel 31A, is initially processed by the WRITE DATA PROCESS BLOCK 36 to detect the data patterns for overshoot amplitude adjustment. BLOCK 36 generate the corresponding overshoot amplitude signal that drives the Amplitude-Level Modulation (AML MOD) UNIT 33, which in turn drives the WRITE BUFFER 32. The data stream output signal from WRITE BUFFER 32, which goes to the Write Driver Preamp 18A, is a differential signal that includes amplitude modulation.

The channel uses AML modulation to assign a predetermined specified overshoot to each bit sequence. The data patterns and the corresponding overshoot amplitudes can be determined empirically for a particular disk drive. The AML modulation can be a minimum of two levels to have two-amplitude-level modulation or even higher levels (three, four, etc.). The minimum two level would then be a simple two-level overshoot control.

Write Driver Preamp 18A generates the write driver output signal which is connected to the write coil in the slider. The output of the write driver's signal in the Preamp is controlled by the AML-CML signal 39, where the CML portion of the signal controls the reversal signal for the coil at the output of the write driver, which determines the magnetic transitions, and the AML portion controls the overshoot. As noted the channel output has an AML modulator to assign the specified overshoot amplitude to each bit sequence. In turn, the Write Driver Preamp 18A has an AML Demodulator 41 (or peak threshold logic) for determining the overshoot settings.

Inside the Preamp 18A the write data transitions themselves are utilized as the clock signal to load and set the Preset Buffer 42 for the overshoot, where the present overshoot value is initialized before the subsequent write current transition. Therefore, Latch Clock 45 is set by transitions in the data ($T_n$).

The delays, OSA Preset Delay D1 35 and Write Path Delay D2 34, are set such that the Preset Buffer 42 is loaded in time for the subsequent transition, and delay D3 allows for the trigger signal (Trg) 46S from Trigger Sample Block 46 to capture the AML-CML signal for demodulation or peak detection.

The AML DMOD block 41 converts the peak signal to the OSA level and supplies this signal to Trigger Sample Block 46. The Latch Clock 45 signal triggers sampling of the OSA level in the Trigger Sample Block 46 for processing, 46S by the write driver 51, which sets the corresponding OSA output signal to the write head.

Figure 4A:
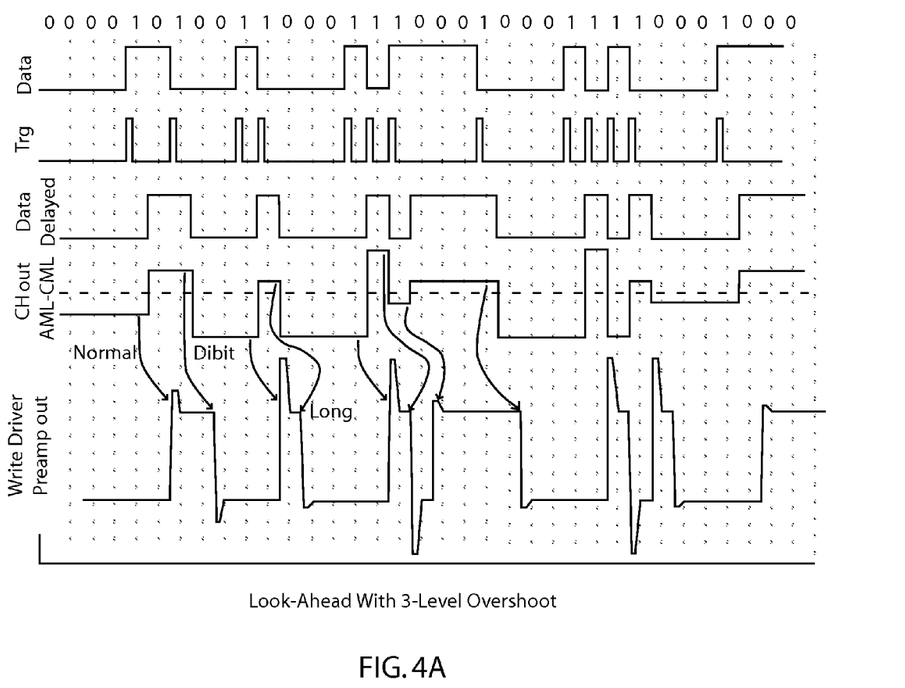
FIG. 4A is a signal timing diagram showing selected signals for a sample data stream for an embodiment of the invention using look-ahead with 3-level overshoot control.

FIG. 4A is a signal timing diagram for an embodiment of a Channel-Preamp Dynamic Wave Shape (CP-DWS) system using look-ahead with 3-level overshoot control. The timing diagram in FIG. 4A illustrates the timing relationships of the trigger signal (Trg) 46S and other signals. The selected sample data bit values in the write data received by the channel 31A are shown along the top. The system uses the write data transitions as the latch/trigger signal for capturing and loading the preset buffer. The AML-CML signal generated by the channel 31A, and the resulting preamp write driver output with dynamic wave shaping, are shown. In this example, the AML-CML signal level (amplitude) at the beginning of each transition represents (encodes) the overshoot current that should be applied by the preamp. Other overshoot signal encodings are also possible in other examples/embodiments. In the example shown here, three levels of overshoot are available, but in general N-levels can be used. The 1T-patterns are given additional overshoot current, while long magnets are written using reduced peak currents to minimize cross track interference/erasure. Empirical optimization of the pattern-dependent current settings will be required to achieve optimal error rates while at the same time reducing cross-track interference and maximizing areal density in a particular embodiment. The example embodiment illustrated here uses a look-ahead strategy, where the overshoot applied for each transition depends only on the following bits in the data stream and not on any previously recorded data. However, the general method can also be used to include look-back only and combined look-back/look-ahead strategies, to provide the greatest ability to tune the write waveform for each specific bit sequence in the data.

The waveform example in FIG. 4A as described above (i.e., look-ahead with 3-level overshoot control) is summarized in Table 1 below (for non-return-to-zero (NRZ) encoding), where the underlined data bit transition represents the target bit. "TNEXT" refers to number of time periods until the next transition, i.e. "looking ahead." The 3-levels are referred to as low, nominal and high. The nominal value is selected when a number of time periods until a next magnetic transition for the set of data bits is in a predetermined range, which in this example includes two and three time periods (2T and 3T). In the example the number of low-frequency (NLF) bits is three, so any transition followed by a magnet longer than three time period (3T) patterns will be written with a reduced (low) overshoot, while any one time period (1T) patterns will be written with increased (high) overshoot. This strategy will facilitate recording 1T patterns (using large peak currents) while at the same time reducing cross-track interference issues due to the long magnets by using lower peak currents.

TABLE 1

Example with look-ahead with 3-level overshoot control.

| Description | TNEXT | Example Data | (TNEXT) | OSA (total) |
|---|---|---|---|---|
| Nominal OSA | $2T \leq TNEXT \leq N_{LF}T$ | *1<u>0</u>1 | (=2T) | OSA |
| Low OSA for long magnets | $>N_{LF}T$ | *1<u>0</u>...01 | (>3T) | OSA − OSA$_{LF}$ |
| High OSA for high freq. | =1T | *1<u>1</u> | (=1T) | OSA + OSA$_{Dibit1}$ |

The embodiment described above is an integrated solution that utilizes the write-signal path to carry the overshoot control signal. Other alternative embodiments include multiplexing the read-signal line to transmit the overshoot signal level, because the read-signal line is not otherwise used during writing. Another alternative embodiment could use a dedicated signal line to transmit the overshoot signal level. Both of these alternatives would have the overshoot signal level synchronized with the write data signal that would be triggered/loaded by the write signal transitions.

Figure 5:
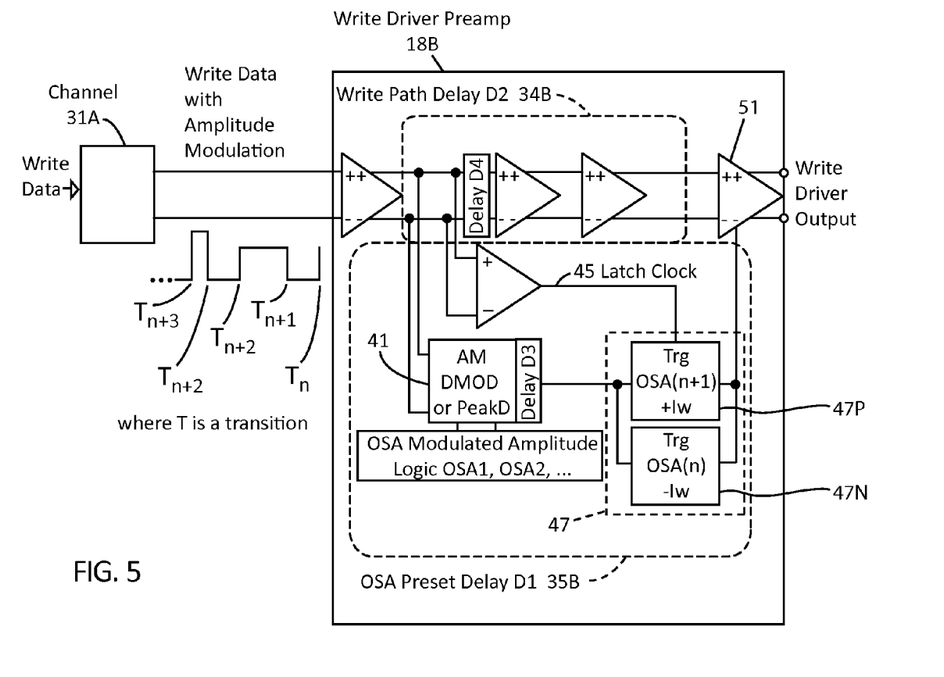
FIG. 5 is a block diagram illustrating selected components in a disk drive with a Channel-Preamp Dynamic Wave Shape system according to a second embodiment of the invention.

With the embodiment shown in FIG. 3, in some applications timing issues may occur where loading of the preset buffers and the delay D3 could be problematic at high data rates. Therefore, FIG. 5 shows a second embodiment with an alternative architecture, with Write Driver Preamp 18B, OSA Preset Delay D1 35B and Write Path Delay D2 34B, where pre-setting of the positive current overshoots, OSA:+Iw, and negative overshoots, OSA:−Iw, is not done in the same phase as the write data. This architecture would allow pre-loading of the overshoot for the subsequent write data transition. The embodiment shown in FIG. 5 uses an alternating switching buffer 47 with separate Trigger Sample Blocks 47P, 47N for positive (+Iw) and negative write currents (−Iw), which allows a 1T setup time between transitions. Note that this embodiment does not require a preset buffer.

Figure 6:
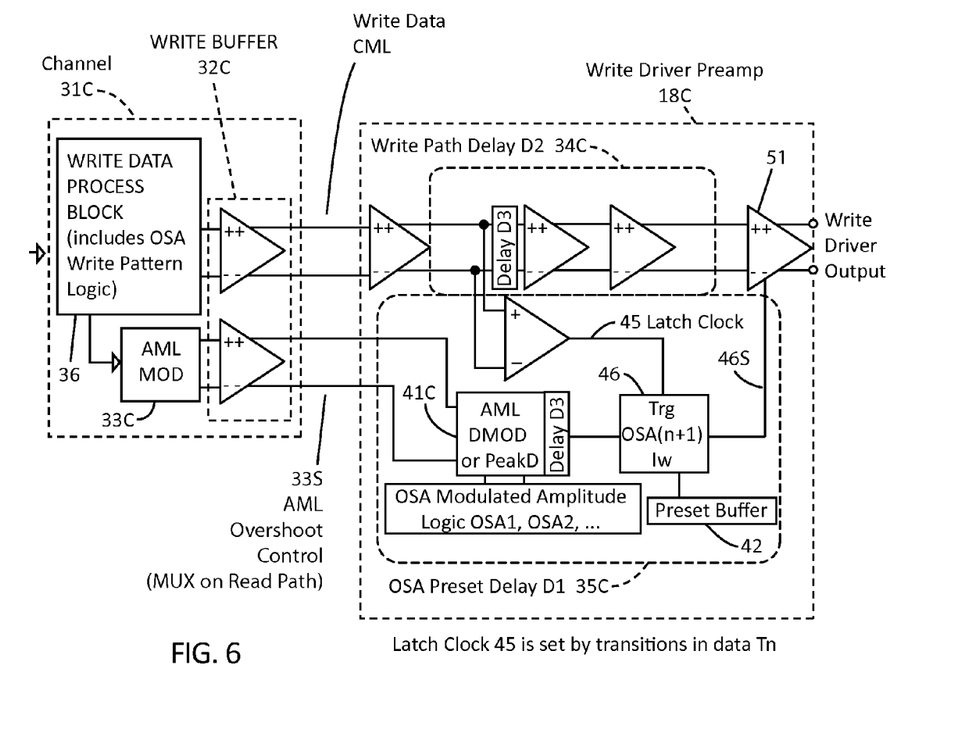
FIG. 6 is a block diagram illustrating selected components in a disk drive with a Channel-Preamp Dynamic Wave Shape system according to a third embodiment of the invention.

FIG. 6 shows a third embodiment of the invention that uses a separate signal path for the overshoot control. This embodiment uses channel 31C which provides an overshoot control signal 33S from Write Buffer 32C, which is multiplexed on the read signal lines, which are not otherwise used during write operations. The Write Driver Preamp 18C with OSA Preset Delay D1 35C and Write Path Delay D2 34C, includes AML Demodulator 41C which receives the overshoot control signal 33S, but otherwise functions as described above for the first embodiment.

Figure 4B:
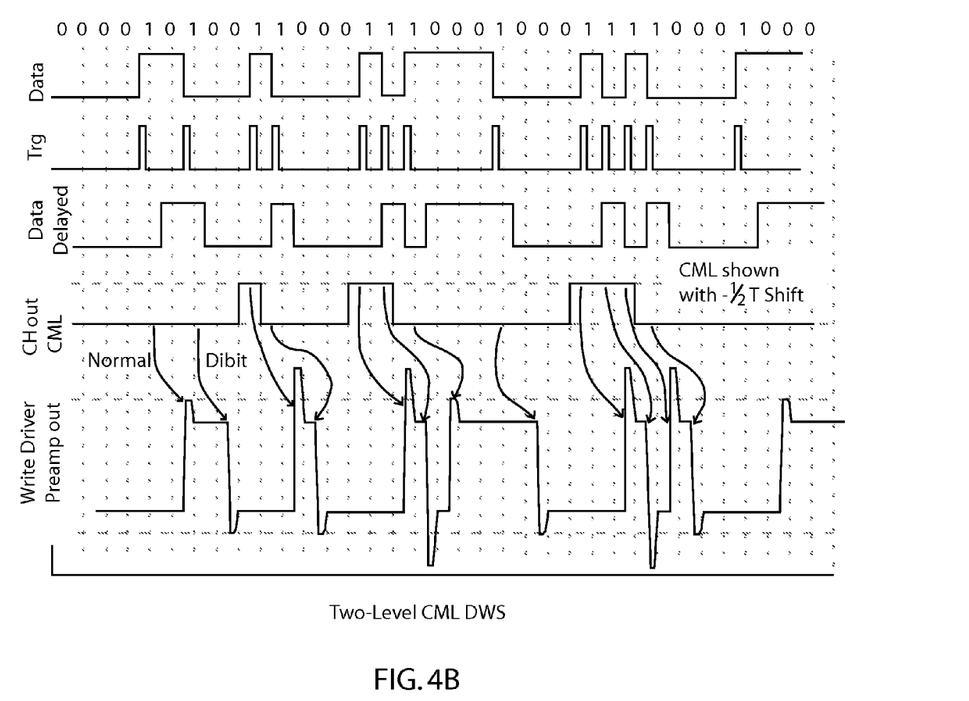
FIG. 4B is a signal timing diagram showing selected signals for a sample data stream for an embodiment of the invention using look-ahead with 2-level overshoot control.

FIG. 4B is a signal timing diagram showing selected signals for a sample data stream for an embodiment of the invention using look-ahead with 2-level overshoot control.

TABLE 2

Example with look-ahead with 2-level overshoot control.

| Description | TNEXT | Example Data | OSA (total) |
|---|---|---|---|
| Nominal OSA | >2T | *1<u>0</u>101010001 | OSA |
| High OSA | ≤2T | *1<u>1</u>10101011 | OSA + OSA$_{Dibit1}$ |

The waveform example in FIG. 4B as described above (i.e., look-ahead with 2-level overshoot control) is summarized in Table 2 (for non-return-to-zero (NRZ) encoding), where the underlined data bit transition represents the target bit.

The 2-levels are referred to as nominal and high. The nominal value is selected when a number of time periods until a next magnetic transition for the set of data bits is greater than a predetermined value, which in this example is more than two time period (>2T). All other time periods, which in this example include only one and two time periods (≤2T) patterns, will be written with increased (high) overshoot.

FIG. 4B also shows a ½ T CML delay shift, which is controlled by the Channel 31A. Although a ½ T is shown, the Channel can be programmed to adjust this delay to accommodate the phase in the Channel 31A and the Write Driver Preamp 18A.

The invention claimed is:

1. A disk drive comprising:
a disk with thin film magnetic material on a surface;
an inductive write head for selectively magnetizing portions of the magnetic material on the surface of the disk and creating magnetic transitions to record data bits;
a channel system that analyzes a set of data bits to be written on the disk to determine the set of magnetic transitions required to record the set data bits and generates for each transition a corresponding overshoot control signal that selects an overshoot amplitude level from a set of overshoot amplitude values that includes two or more predetermined values, the overshoot amplitude level being selected depending on detection of predetermined patterns of data bits following each magnetic transition with a preprogrammed delay between the write data and the overshoot control signal; and
a write driver preamplifier that receives one or more signals from the channel system signal that encode the magnetic transitions for the set of data bits and the corresponding overshoot control signal, and the write driver preamplifier generating an output signal for the inductive write head that applies the overshoot amplitude level based on the overshoot control signal.

2. The disk drive of claim 1 wherein the overshoot control signal received by the write driver preamplifier is encoded as an amplitude-level modulated (AML) signal.

3. The disk drive of claim 1 wherein the overshoot control signal received by the write driver preamplifier is encoded as an amplitude-level modulated (AML) signal that is part of a composite signal that includes a current-mode logic (CML) signal that encodes the data bits.

4. The disk drive of claim 1 wherein the write driver preamplifier generates a latch clock signal for a Trigger Sample Block from the write data transitions and the Trigger Sample Block generates an amplitude control signal for a write driver.

5. The disk drive of claim 4 wherein the Trigger Sample Block receives a signal from an amplitude-level demodulator that determines the overshoot amplitude.

6. The disk drive of claim 5 wherein amplitude-level demodulator receives an amplitude-level modulated (AML) signal from the channel system over a signal path that also carries a read signal.

7. The disk drive of claim 5 wherein amplitude-level demodulator receives an amplitude-level modulated (AML) signal from the channel system as part of a composite signal that includes a current-mode logic (CML) signal that encodes the data bits.

8. The disk drive of claim 1 wherein the write driver preamplifier includes a preset buffer that is pre-loaded with an overshoot amplitude control value for a subsequent write data transition.

9. The disk drive of claim 1 wherein the write driver preamplifier includes a first Trigger Sample Block for positive write currents and a second Trigger Sample Block for negative write currents are used, and a setup time between write data transitions is one time period (1T).

10. The disk drive of claim 1 wherein the set of overshoot amplitude values includes three discrete values corresponding to a nominal overshoot amplitude, a low overshoot amplitude that is less than the nominal overshoot amplitude and a high overshoot amplitude that is more than the nominal overshoot amplitude, and the nominal overshoot amplitude value is selected when a number of time periods until a next magnetic transition for the set of data bits is in a predetermined range, and the low overshoot amplitude value is selected when the number of time periods until the next magnetic transition is greater than the predetermined range, and the high overshoot amplitude value is selected when the number of time periods until the next magnetic transition is less than the predetermined range.

11. The disk drive of claim 1 wherein the set of overshoot amplitude values includes two discrete values corresponding to a nominal overshoot amplitude and a high overshoot amplitude that is more than the nominal overshoot amplitude, and the nominal overshoot amplitude value is selected when a number of time periods until a next magnetic transition for the set of data bits is greater than a predetermined value, and the high overshoot amplitude value is selected when the number of time periods until the next magnetic transition is less than or equal to the predetermined value.

12. A disk drive comprising:
a disk with thin film magnetic material on a surface;
an inductive write head for selectively magnetizing portions of the magnetic material on the surface of the disk and creating magnetic transitions to record data bits;
a channel system that analyzes a set of data bits to be written on the disk and generates a current mode logic (CML) signal that encodes a set of magnetic transitions required to record the set data bits and generates for each transition a corresponding amplitude-level modulated (AML) overshoot control signal that selects an overshoot amplitude level from a set of overshoot amplitude values that includes two or more predetermined values, the overshoot amplitude level being selected depending on detection of predetermined patterns of data bits following each magnetic transition with a preprogrammed delay between the write data and the overshoot control signal; and
a write driver preamplifier that receives one or more signals from the channel system signal that include the current mode logic (CML) signal and the amplitude-level modulated (AML) overshoot control signal, the write driver preamplifier including an Demodulator for the AML overshoot control signal that determines the corresponding overshoot amplitude level that is supplied to a Trigger Sample Block, the Trigger Sample Block being driven by a Latch Clock that is set by transitions in the current mode logic (CML) signal, and the write driver preamplifier generating an output signal for the inductive write head that applies the corresponding overshoot amplitude level based on the current mode logic (CML) signal and overshoot control signal from the Trigger Sample Block.

13. The disk drive of claim 12 wherein the one or more signals received by the write driver preamplifier from the channel system includes a composite signal that includes the current-mode logic (CML) signal and the amplitude-level modulated (AML) overshoot control signal.

14. The disk drive of claim 12 wherein the Demodulator receives the amplitude-level modulated (AML) overshoot control signal from the channel system over a signal path that also carries a read signal.

15. The disk drive of claim 12 wherein the write driver preamplifier includes a preset buffer that is pre-loaded with an overshoot amplitude control value for a subsequent write data transition.

16. The disk drive of claim 12 wherein the Trigger Sample Block includes a first unit for positive write currents and a second unit for negative write currents are used, and a setup time between write data transitions is one time period (1T).

17. The disk drive of claim 12 wherein the set of overshoot amplitude values includes three discrete values corresponding to a nominal overshoot amplitude, a low overshoot amplitude that is less than the nominal overshoot amplitude and a high overshoot amplitude that is more than the nominal overshoot amplitude, and the nominal overshoot amplitude value is selected when a number of time periods until a next magnetic transition for the set of magnetic transitions, and the low overshoot amplitude value is selected when the number of time periods until the next magnetic transition is greater than the predetermined range, and the high overshoot amplitude value is selected when the number of time periods until the next magnetic transition is less than the predetermined range.

18. The disk drive of claim 12 wherein the set of overshoot amplitude values includes two discrete values corresponding to a nominal overshoot amplitude and a high overshoot amplitude that is more than the nominal overshoot amplitude, and the nominal overshoot amplitude value is selected when a number of time periods until a next magnetic transition for the set of magnetic transitions is greater than a predetermined value, and the high overshoot amplitude value is selected when the number of time periods until the next magnetic transition is less than or equal to the predetermined value.

\* \* \* \* \*